Patented Dec. 5, 1922.

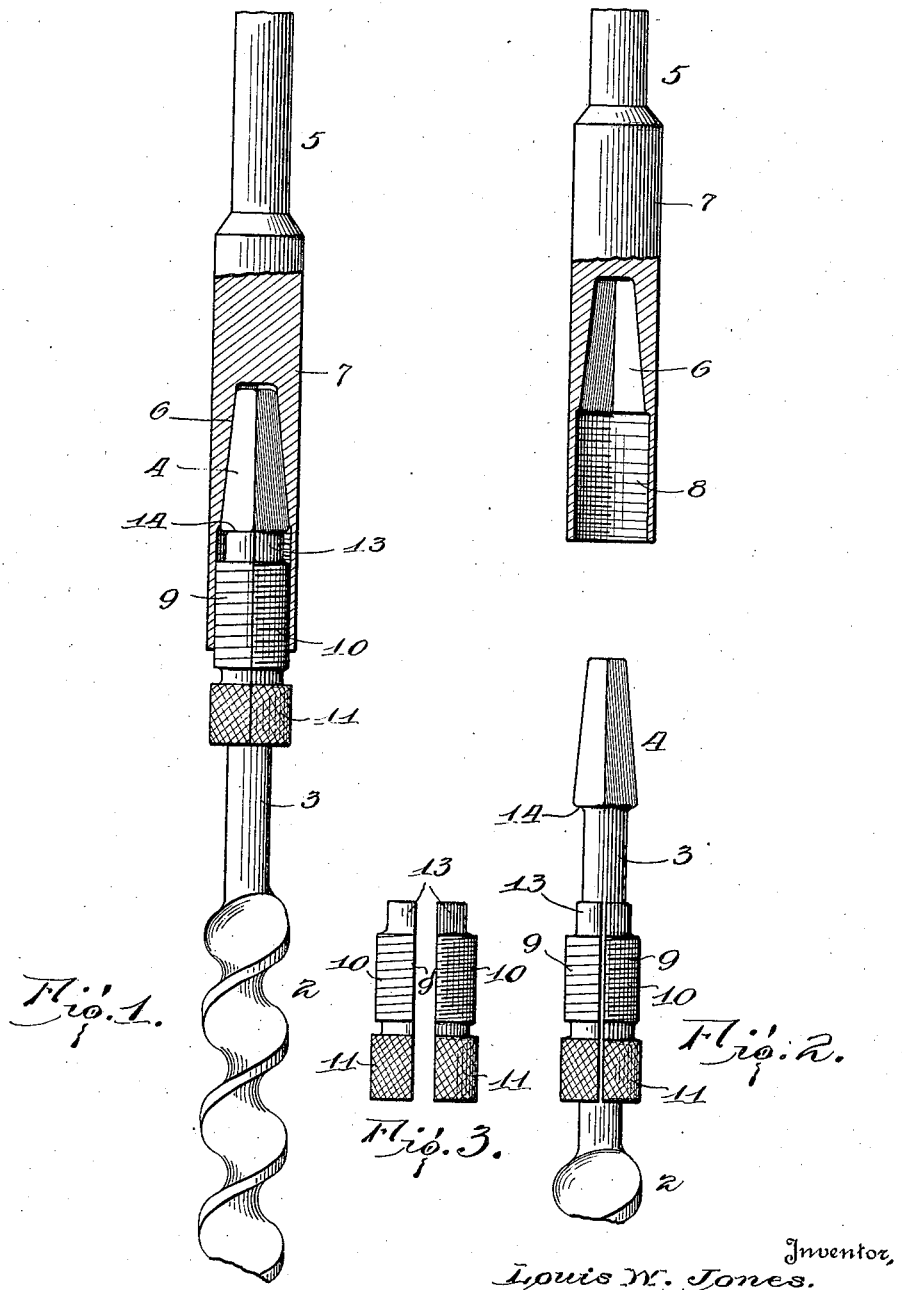

1,438,040

UNITED STATES PATENT OFFICE.

LOUIS W. JONES, OF CLEVELAND, OHIO.

TOOL HOLDER.

Application filed June 2, 1922. Serial No. 565,365.

*To all whom it may concern:*

Be it known that I, LOUIS WILSON JONES, a citizen of the United States, residing at Cleveland, in the county of Cuyahoga and State of Ohio, have invented certain new and useful Improvements in Tool Holders, of which the following is a specification.

My invention relates to tool holders and bit stocks, being particularly adapted for use in connection with extension bit holders such as are now commonly used by installing electricians to carry the augers or boring tools used in making openings for electric conductors and conduits. It is well known that these tools have to be frequently used in inaccessible places, requiring the employment of either an excessively long tool or else a long tool holder. An auger or bit being thus used will sometimes become stuck, and much difficulty will be experienced in removing it. My invention has for its object to provide a holder for a boring or like tool that will follow the hole produced by the tool, will positively rotate the tool, either to advance or retract it, and will give good support to the stem of the tool, the holder being of simple, but exceedingly rigid, construction.

In the accompanying drawings—

Figure 1 is an elevation of my invention applied to a holder for an auger or wood boring tool, the parts being assembled and the holder being in section.

Fig. 2 is a view similar to Fig. 1 except that the parts are separated.

Fig. 3 is a detail elevation of the split clamping sleeve that holds the tool in the stock.

Referring to the drawing, 2 indicates the tool, in this instance a wood boring auger. It is formed as usual with a shank 3 and a tapering head 4, square or angular in cross section. 5 designates a tool holder, for instance, an extension holder having a long stem, and an enlarged end 7 in which is formed a socket 6 for the head of the tool. This socket should be a little longer than is the head, to permit the latter to be fully inserted into and to tightly fit the socket, when forced therein as will be described. The portion of the enlargement beyond the socket is internally screw-threaded as indicated at 8.

9, 9 indicate the sections of a split sleeve adapted to engage with the tool holder and confine the tool therein. These are formed with intermediate externally screw-threaded portions 10 adapted to engage with the screw-threaded part of the socket of the tool holder, with outer milled end portions 11, and with inner end portions 13 of reduced diameter, as compared with the intermediate screw-threaded parts 10, adapted to bear against the shoulder of the tool where the head 4 thereof unites with the shank 3.

The parts thus far described are assembled as follows. The headed end of the tool is inserted into the socket of the holder and the segments 9 of the split sleeve fitted about the shank of the tool, as represented in Fig. 2, and slipped along the same until the intermediate screw-threaded portions 10 thereof engage with the screw-threaded portion of the socket of the holder, when, by rotation of the sleeve it will be caused to enter the socket of the tool holder and engage with the head of the tool, such rotation being easily effected by means of the exposed milled ends 11 of the clamping and holding sleeve. As the sleeve advances, entering the socket of the tool holder, the ends 13 of the segments come into engagement with the shoulder of the head of the tool, when further advance of the sleeve forces the tool tightly into the socket, and secures it rigidly in place.

It will be observed by reference to the drawing that no part of the split sleeve is as large in diameter as is the enlarged end 7 of the tool holder, thus permitting the holder to follow the tool into any hole or aperture it may form. The holder described gives to the shank of the tool a long and rigid support, formed, first, by the engagement of the angular head with the socket 6, and further by the encircling split sleeve which has long screw-threaded engagement with the socket portion of the tool holder. Not only has the split sleeve long engagement with the tool holder but it also has long engagement with the shank 3 of the tool, such engagement extending in both directions beyond the screw-threaded part 10 of the sleeve. The shank or stem of the tool is thus tightly clamped from the head 4 thereof for a distance beyond the end of the holder 7 determined by the length of the sleeve. I find this support of the shank most desirable since it very much lessens the danger of bending or twisting it when in use. It will also be observed that the portions 13 of the holding sleeve are of such reduced size that they may pass beyond the screw-threaded portion 8 of the tool holder and even enter somewhat into the socket 6 should the tapering head 4 of the tool be of such size, relative to the socket, as to make it desirable that the portions 13 should thus follow the head into the socket in order to insure close engagement between the head and socket.

Force applied torsionally to rotate the tool, either to advance or retract it, is transmitted directly from the holder or stock 5 to the tool, and not intermediately through the confining sleeve formed of the segments 9. On the other hand the sleeve gives lateral support to the shank of the tool along a considerable extent of the latter, lessening danger of bending the shank. The split sleeve may be of any desired length suitable to the tool with which it is to be used. By constructing the sleeve so that it is of smaller diameter in all its parts than is the boring portion of the tool with which it is to be associated, and also smaller than the enlarged socketed portion 7 of the holder, there is no danger of the exposed parts of the sleeve engaging with the walls of the hole formed by the tool, which might tend to rotate the sleeve and release the tool from the holder; or of its preventing the tool holder from following the tool into the aperture being formed.

What I claim is:—

1. The combination with a tool having an angular headed shank, of a tool holder formed with a socket to receive and fit the head of the tool and with a portion beyond the socket internally screw-threaded, and a sleeve externally screw-threaded to engage with the screw-threaded portion of the socket of the tool holder and adapted to surround and fit the shank of the tool and at its inner end to bear against the head thereof, the sleeve extending at each end beyond its screw-threaded portion so as to insure long clamping engagement with the tool shank and being longitudinally split to form separable segments.

2. The combination stated in claim 1 in which the inner portion of the sleeve that extends beyond the screw-threaded part thereof is of reduced diameter permitting it to enter into the socket part of the tool holder and force the head of the tool closely into its seat.

3. The combination with a tool having an angular head and a cylindrical shank between the head and the tool proper, of a tool holder formed with a socket to receive and fit the head and with an internally screw-threaded portion of larger diameter, internally, than the cavity of the socket, and a sleeve surrounding the tool shank and rotatable relative thereto, externally screw-threaded at its intermediate portion to engage with the screw-threaded portion of the tool holder, and having an inner cylindrical part of reduced diameter relative to the screw-threaded part adapted to fit the shank of the tool adjacent to the head and to have its end engage with the headed portion of the tool, the sleeve being formed of separable segments.

LOUIS W. JONES.